Patented Sept. 11, 1934

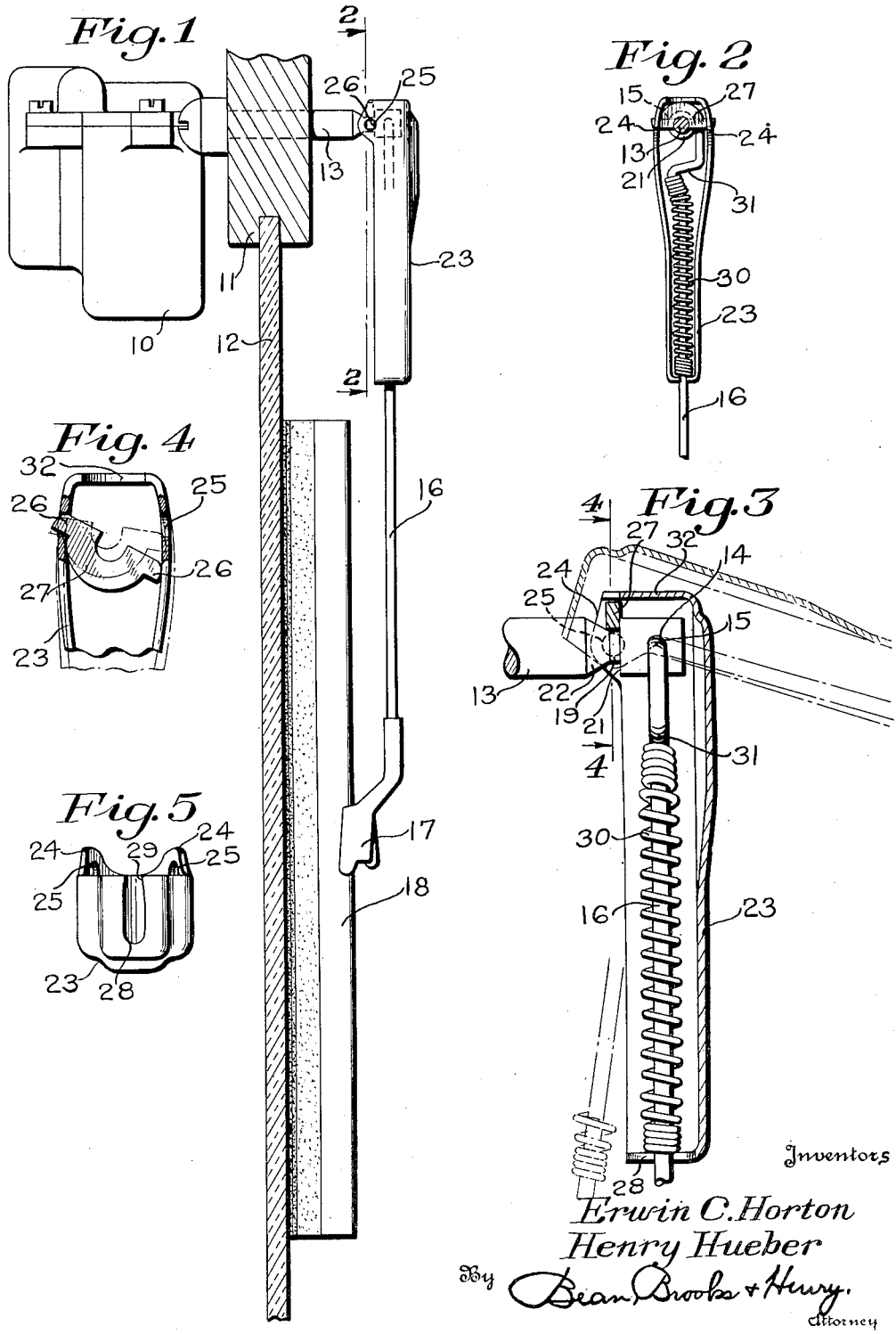

1,973,481

UNITED STATES PATENT OFFICE 1,973,481

WIPER CARRYING ARM

Erwin C. Horton, Hamburg, and Henry Hueber, Buffalo, N. Y., assignors to Trico Products Corporation, Buffalo, N. Y.

Application April 9, 1931, Serial No. 528,904

7 Claims. (Cl. 15—255)

This invention relates to windshield cleaners and particularly to means for mounting wiper carrying arms upon the actuating shafts of such cleaners.

More particularly this invention relates to a means for mounting wiper arms to the actuating shafts in which the arm is pivoted to the shaft for movement away from the windshield. Means are provided for embracing the engaged portions of the aforementioned parts to conceal them from view, the means being pivoted to the actuating shaft on an axis substantially diametral of the actuating shaft in order that the wiper arm may have a large angular movement within a plane normal to the plane of the windshield to displace the wiper blade a substantial distance from the windshield when the latter is being washed, or for other reasons, without detaching it. The housing means which embraces the connected portions of the actuating shaft and wiper arm also contains spring means for urging the wiper arm, about its axis of connection to the actuating shaft, toward the windshield.

The housing means comprises an elongated hollow stirrup body opening toward the actuating shaft and embracing the end thereof. The wiper carrying arm is pivoted to the actuating shaft within the confines of the housing and extends longitudinally thereof through an opening which is formed at one end of the housing. In order to facilitate the assembly of the parts the end of the housing which engages the wiper carrying arm is provided with a slot defined by resilient wall portions which preferably converge to provide a restricted mouth for the slot so that the wiper arm may be snapped into place by spreading the mouth of the slot and will be thereafter removably retained therein against accidental displacement.

In certain vehicle constructions a sun visor or the forward edge of the roof extends forwardly of the windshield over the windshield cleaner so that it is sometimes difficult to remove the wiper blade and arm by following the usual procedure of lifting the wiper arm upwardly about its axis of connection to the cleaner actuating shaft, the roof or visor interfering with such movement. The slotted housing of this invention permits of the ready removal of the wiper carrying arm and blade under such conditions, it being merely necessary to disengage the arm from the restricted mouth of the slot and to move the housing upwardly to effect such removal. The parts may be reassembled by reversing the steps.

These and other objects and advantages will become apparent from the following description of one typical embodiment of the invention, reference being made to the accompanying drawing wherein, Fig. 1 is a side elevation of a windshield cleaner embodying the present invention, the cleaner being mounted upon a windshield header bar which is shown in vertical section.

Fig. 2 is a view taken along line 2—2 of Fig. 1, the actuating shaft being shown in cross section and the wiper arm mounting parts being shown in rear elevation.

Fig. 3 is an enlarged vertical section through the wiper arm mounting parts, the view being taken at right angles to that of Fig. 2.

Fig. 4 is a sectional view taken along line 4—4 of Fig. 3.

Fig. 5 is a bottom view of the housing member showing the slot therein.

As shown in Fig. 1 the windshield cleaner may comprise a motor 10 mounted upon a header bar 11 above the windshield 12 of a vehicle. An actuating shaft 13 of the motor is provided at its outer end with a bearing 14 for disengageably receiving a pintle portion 15 of a wiper carrying arm 16, the axis of the pintle being substantially diametral of the shaft 13. The opposite end of the arm 16 carries a supporting bracket 17 for carrying the wiper blade 18 in wiping contact with the windshield glass 12. A seat portion 19 is formed on the shaft adjacent the bearing 14 and preferably is in the form of an annular recess having a plane shoulder 21 transverse of the axis of the shaft and a sloping or conical shoulder 22.

A housing or stirrup 23 of hollow formation and opening toward the actuating shaft 13 is disposed about the end of the latter and about the portion of the wiper arm adjacent to the shaft. It has a front wall which may be of ornamental character and rearwardly extending top, bottom and side walls. A pair of ears 24 are formed on the side walls of the stirrup adjacent the seat 19 and are provided with bearing openings 25 for receiving oppositely disposed trunnions 26 of a saddle 27, which is thereby carried by the stirrup. As shown in Fig. 4, the ends of the trunnion portions may be rounded in order to provide cam means for spreading apart the ears 24 to enter the trunnions in the bearings 25. The saddle is formed to fit upon the seat 19 in such manner that the axis of the trunnions 26 will be substantially diametral of the shaft 13 and substantially parallel to the axis of the pintle 15 and bearing 14.

The lower wall of the stirrup is provided with a slot 28 which is slightly restricted at its mouth 29. As shown in Figs. 2 and 3, the wiper arm extends through the slot, being retained therein against accidental displacement by the restricted mouth 29, which may be spread by reason of the resilience of the stirrup to permit assembly or disassembly of the arm and stirrup by moving the arm between the broken and full line positions thereof shown in the lower part of Fig. 3.

A coiled compression spring 30 is disposed about the arm 16 within the confines of the stirrup, one end of the spring seating against the bottom wall of the stirrup and the opposite end seating against a shoulder 31 formed on the arm adjacent the pintle portion 15. It will be noted that the force axis of the spring 29, which is substantially coincidental with the axis of the arm 16, is laterally offset from the axis of the saddle trunnions so that the spring, acting against the actuating shaft through the pintle 15 and against the stirrup 23, will urge the wiper arm about its pintle axis in a clockwise direction as viewed in Figs. 1 and 3 or toward the windshield, so that the wiper blade 18 will be pressed against the windshield glass with sufficient pressure to insure proper wiping action during operation of the cleaner. The spring, being disposed upon the side of the shaft opposite the portion of the shaft engaged by the saddle 27, will also function to retain the saddle against the seat, the forward side of the saddle seating against the transverse plane shoulder 21. In normal operation of the actuating motor 10 and shaft 13, the arm 16 and blade 18 carried thereby will move as a unit in a path parallel to the windshield glass, the transverse disposition of the pintle 16 relative to the shaft 13 insuring this action.

When it is desired to displace the blade 18 from the windshield glass for washing the latter or for another purpose, the arm and blade may be readily swung outwardly from the windshield about the axis of the pintle 15 to the broken line position depicted in the upper part of Fig. 3, such movement further compressing the spring 30. In the position illustrated in Fig. 3 the rearward edge 32 of the upper wall of the stirrup abuts the shaft 13 so that further upward movement of the arm will cause the saddle 27 to be lifted from its seat. The stirrup 23 will upon such further upward movement be disposed completely above the pintle 15, so that the latter may be moved laterally to disengage it from the bearing 14 to effect a complete removal of the arm and stirrup from the actuating shaft.

The device may be readily assembled by first inserting the medial portion of the wiper arm in the slot 28; by then inserting the pintle 15 in the bearing 14; and by then lifting the stirrup upwardly and over the actuating shaft, against the compression of the spring 30, to effect the engagement of the saddle 27 with its seat 19, the sloping or conical shoulder 22 on the shaft enabling the saddle to be readily seated.

When, because of a forwardly extended roof or visor, it is difficult or impossible to lift the wiper carrying saddle assembly to the position shown in broken lines in the upper part of Fig. 3, the assembly may be detached from the actuating shaft 13 by disengaging the arm 16 from the restricted mouth of the slot 28, thereby placing the parts in the relative positions shown by the lower part of Fig. 3 in which the wiper carrying arm is shown in broken lines. Thereafter upon upward movement of the stirrup 23 the saddle 27 will be lifted from engagement with the seat 19 and the stirrup may be swung forwardly to permit of disengagement of the pintle 15 from the bearing 14. The arm and stirrup assemblies may be replaced or remounted upon the actuating shaft by reversing these steps. In doing this the pintle is first engaged in its bearing; the stirrup is then placed over the end of the actuating shaft with its saddle 27 in engagement with the seat 19; the spring 30 is then compressed; and the arm 16 is entered in the slot 28 so that the parts will assume the relationship shown in full lines in Fig. 3.

It will now be understood that the present invention provides an improved wiper arm mounting in which the wiper arm is pivoted directly to the actuating shaft for movement therewith in a path parallel to the windshield glass and also for movement relative to the shaft in a plane normal to the windshield glass. The spring means, including the stirrup 23 and a spring element 30 encased by the stirrup, are engaged with a portion of the actuating shaft, being pivoted for movement relative thereto about the axis of the trunnions 26 of the saddle, which is substantially diametral of the actuating shaft and parallel to the pintle 15, and have guided engagement with the wiper arm 16 (the wiper arm within the slot 28) so that the whole assembly, including the wiper arm and stirrup, may be swung outwardly from the windshield glass against the urge of the spring means which normally retain the wiper blade in contact with the glass. The diametral disposition of the pivot axis of the stirrup enables a large angular movement of the arm assembly about the axis of the pintle 15 without disengagement of the stirrup or saddle from the actuating shaft. The side walls of the stirrup, as shown in Fig. 2, are in close proximity to the pintle 15 and bearing 14 and will thus prevent displacement of the pintle from the bearing except when the arm is raised against the compression of the spring 30 to a position above that shown in dotted lines in Fig. 3. The provision of the slot in the lower wall of the housing enables the ready assembly and disassembly of the wiper carrying arm with the stirrup and makes possible the attachment of the bracket 17 to the arm 16 and the formation of the opposite end of the arm, to provide the shoulder 31 and the pintle 15, before the arm is assembled with the stirrup.

It will be further understood that the device herein described and illustrated is merely one typical embodiment of the invention and that other embodiments utilizing the same principles may be made within the scope of this invention.

What is claimed is:

1. In a windshield wiper, a shaft and a wiper connected pivotally thereto, a stirrup member connected pivotally to the shaft and spring means for urging the stirrup about its pivotal connection and toward the windshield, a portion of the stirrup spaced from the shaft having a recess with a restricted mouth for retaining an adjacent portion of the arm within the recess, said portion of the stirrup being resilient whereby the arm may be removed from the recess by spreading the restricted mouth.

2. In a windshield wiper, an actuating member, a stirrup carried by the actuating member and having a portion with a restricted mouthed slot, a rod extending through the slot and removably held therein by the restricted mouth thereof, said rod engaging the actuating member, spring means carried by the rod and engaging and exerting pressure upon the portion of the stirrup having the slot in a direction away from the actuating member, and said rod being removable from the slot by flexing the restricted mouth portion.

3. In a windshield cleaner, an actuating shaft, a rod having a pintle disengageably journalled in said actuating shaft, a compression spring disposed about said rod and having the end thereof adjacent to the actuating shaft engaged with said rod, a stirrup having a portion with a restricted mouthed slot receiving said rod and engaging the opposite end of said spring to hold it compressed, said stirrup having a part associated therewith for engaging the actuating shaft on the side thereof opposite to said spring, whereby said spring will hold the said part of the stirrup engaged with the actuating shaft, and whereby said rod and stirrup may be removed from said actuating shaft by disengaging the rod from the slot through the mouth thereof to release the compression of said spring.

4. In a windshield cleaner, a shaft and a wiper blade carrying arm connected at its upper end to the forward end of the shaft, a casing member having a front wall lying in front of and substantially paralleling the upper portion of the arm, said casing member having upper and side walls extending rearwardly from the front wall and concealing the upper part of the arm and the forward portion of the shaft, the lower end of the casing having an opening extending from the rear face of the casing for receiving a portion of the arm, and said casing having resilient portions adjacent the opening for engaging and retaining said portion of the arm when inserted into the opening.

5. In a windshield cleaner, a shaft member and a wiper carrying arm member connected at its upper end to the shaft member, a casing having a front wall and top, bottom and side walls extending rearwardly from said front wall, the top wall being adapted to seat on the upper surface of one of said members adjacent the connection of said members and the bottom wall having an opening through which the arm member extends, an abutment on the arm between the shaft and said bottom wall, a coiled spring disposed about the arm and having its ends pressing against said abutment and bottom wall to urge the casing downwardly to resiliently retain the upper wall thereof seated upon said upper surface, and said spring being housed and concealed by the casing walls.

6. In a wiper mounting for windshield cleaners having an actuating member provided at its end with a bearing and a seat, an open elongated housing element with a front wall and side and lower walls extending therefrom, said housing element having its upper end engaged with said seat, said lower wall having a restricted mouthed slot therein, a rod having a pintle journalled in said bearing, said rod having a portion extending through the slot, and a coil spring extending about said rod and fixed at one end against displacement along the rod and the other end bearing against the lower wall of the housing element, said lower wall being resilient, whereby the mouth of the slot may be spread to remove the rod therefrom.

7. In a windshield wiper, an actuating shaft, a rod pivoted to the shaft for pivoting about an axis substantially transverse of the shaft, a stirrup having one end engaging over the shaft and the other end engaging a portion of the rod spaced from the pivot axis, the portion of the stirrup engaging the rod having an open-mouthed slot receiving the rod and the mouth of the slot being restricted and resilient to prevent accidental displacement of the rod through the mouth of the slot while permitting the rod to be manually moved through the mouth by spreading the latter.

ERWIN C. HORTON.
HENRY HUEBER.